United States Patent
Sabic et al.

(10) Patent No.: US 12,496,697 B2
(45) Date of Patent: Dec. 16, 2025

(54) WORK TOOL AND TRANSMISSION SYSTEM THEREOF

(71) Applicant: Techtronic Cordless GP, Anderson, SC (US)

(72) Inventors: Adis Sabic, Kwai Chung (CN); Xin Ran Lu, Dongguan (CN); Ruo Yang Hu, Dongguan (CN)

(73) Assignee: TECHTRONIC CORDLESS GP, Anderson, SC (US)

( * ) Notice: Subject to any disclaimer, the term of this patent is extended or adjusted under 35 U.S.C. 154(b) by 75 days.

(21) Appl. No.: 18/089,718

(22) Filed: Dec. 28, 2022

(65) Prior Publication Data

US 2023/0202017 A1 Jun. 29, 2023

(30) Foreign Application Priority Data

Dec. 28, 2021 (CN) .......................... 202111621547.X

(51) Int. Cl.
*B25F 3/00* (2006.01)
*F16D 1/10* (2006.01)

(52) U.S. Cl.
CPC .................. *B25F 3/00* (2013.01); *F16D 1/10* (2013.01); *F16D 2001/102* (2013.01)

(58) Field of Classification Search
CPC ...... B25F 3/00; B25F 5/02; B25F 5/00; B25F 5/001; F16D 1/10; F16D 2001/102; F16D 1/101; A01G 3/086; A01G 3/0335

(Continued)

(56) References Cited

U.S. PATENT DOCUMENTS 2,917,909 A * 12/1959 Josutis ...................... F16D 3/72
  464/60
3,069,875 A * 12/1962 Crum, Jr. ................ F16D 1/101
  464/169

(Continued)

FOREIGN PATENT DOCUMENTS

AU   2009299098 B2   7/2014
CA      2192285 A1 * 6/1997

(Continued)

OTHER PUBLICATIONS

European Search Report Corresponding with Application No. EP22213031 on MAY 29, 2023 (2 pages).

*Primary Examiner* — Robert F Long
(74) *Attorney, Agent, or Firm* — Dority & Manning, P.A.

(57) ABSTRACT

A work tool and transmission system thereof. The transmission system comprises: a first shaft (250) and a second shaft (350), a near end (351) of the second shaft having a first mating part; a shaft coupler (600), a far-side part (620) of the shaft coupler having a second mating part matched in shape to the first mating part; and a coupling mechanism capable of directly or indirectly applying a coupling force to at least one of the first shaft, the second shaft and the shaft coupler; when the far-side part of the shaft coupler is aligned with the near end of the second shaft in the circumferential direction, the coupling force forces the first mating part to engage with the second mating part, so that the shaft coupler transmits rotational movement of the first shaft to the second shaft. The work tool comprises: a transmission system; a motive power head transmission-connected to the first shaft (250); and a working head transmission-connected to the second shaft (350).

22 Claims, 10 Drawing Sheets

(58) Field of Classification Search
USPC ........ 173/197, 81, 90, 140–141, 162.1, 198, 173/213, 168–171
See application file for complete search history.

(56) References Cited

U.S. PATENT DOCUMENTS

| | | | | |
|---|---|---|---|---|
| 3,299,979 A * | 1/1967 | Restall | ................ | A01B 59/062 |
| | | | | 180/14.1 |
| 3,744,350 A * | 7/1973 | Raff | ................ | B25B 13/06 |
| | | | | 81/477 |
| 3,823,474 A * | 7/1974 | Ionescu | ................ | B27B 17/0008 |
| | | | | 16/436 |
| 3,859,821 A * | 1/1975 | Wallace | ................ | F16D 3/76 |
| | | | | 464/89 |
| 3,873,863 A * | 3/1975 | Pew | ................ | H02K 7/145 |
| | | | | 310/90 |
| 3,990,550 A * | 11/1976 | Recker | ................ | F16D 1/116 |
| | | | | 403/325 |
| 4,114,927 A * | 9/1978 | Butcher | ................ | F16L 37/086 |
| | | | | 285/317 |
| 4,179,632 A * | 12/1979 | Harvell | ................ | H02K 7/145 |
| | | | | 403/324 |
| 4,402,626 A * | 9/1983 | Recker | ................ | F16D 1/116 |
| | | | | 403/328 |
| 4,413,937 A * | 11/1983 | Gutsche | ................ | B25F 3/00 |
| | | | | 408/239 R |
| 4,422,794 A | 12/1983 | Deken | | |
| 4,460,296 A * | 7/1984 | Sivertson, Jr. | ................ | B25B 33/005 |
| | | | | 408/239 R |
| 4,505,040 A * | 3/1985 | Everts | ................ | B25F 3/00 |
| | | | | 30/296.1 |
| 4,541,160 A * | 9/1985 | Roberts | ................ | F16C 1/02 |
| | | | | 403/361 |
| 4,733,471 A * | 3/1988 | Rahe | ................ | A01D 34/90 |
| | | | | 403/312 |
| 4,807,499 A * | 2/1989 | Martinez | ................ | B25B 13/06 |
| | | | | 81/177.75 |
| 4,944,711 A | 7/1990 | Hironaka et al. | | |
| 4,971,161 A * | 11/1990 | Godell | ................ | B25F 3/00 |
| | | | | 175/18 |
| 5,149,223 A * | 9/1992 | Watts | ................ | F16D 1/101 |
| | | | | 403/116 |
| 5,501,542 A * | 3/1996 | Hall, Sr. | ................ | F16D 3/2052 |
| | | | | 403/379.2 |
| 5,594,990 A * | 1/1997 | Brant | ................ | B25G 1/04 |
| | | | | 172/14 |
| 5,603,173 A * | 2/1997 | Brazell | ................ | E01H 5/04 |
| | | | | 37/246 |
| 5,653,028 A | 8/1997 | Hashimoto | | |
| 5,765,652 A * | 6/1998 | Mathis | ................ | B25F 5/001 |
| | | | | 173/217 |
| 5,795,232 A * | 8/1998 | Sitzberger | ................ | F16D 3/74 |
| | | | | 464/81 |
| 5,802,724 A | 9/1998 | Rickard et al. | | |
| 5,809,653 A | 9/1998 | Everts et al. | | |
| 5,823,499 A * | 10/1998 | Ito | ................ | B60N 2/067 |
| | | | | 464/57 |
| 5,926,961 A * | 7/1999 | Uhl | ................ | B27B 17/0008 |
| | | | | 30/296.1 |
| 5,992,538 A * | 11/1999 | Marcengill | ......... | B25D 11/102 |
| | | | | 173/171 |
| H1821 H * | 12/1999 | Kosinski | ............................. | 173/4 |
| 6,006,434 A | 12/1999 | Templeton et al. | | |
| 6,035,515 A * | 3/2000 | Baer | ................ | H02K 15/00 |
| | | | | 29/525 |
| 6,056,735 A * | 5/2000 | Okada | ................ | A61B 17/320092 |
| | | | | 606/1 |
| 6,176,322 B1 * | 1/2001 | Wadge | ................ | B25F 3/00 |
| | | | | 408/4 |
| 6,213,672 B1 * | 4/2001 | Varga | ................ | B25G 1/04 |
| | | | | 403/109.1 |
| 6,237,698 B1 * | 5/2001 | Carrier | ................ | H02P 7/288 |
| | | | | 173/171 |
| 6,286,611 B1 * | 9/2001 | Bone | ................ | B25F 3/00 |
| | | | | 173/217 |
| 6,305,867 B1 * | 10/2001 | Schweigert | ............. | F16D 1/101 |
| | | | | 403/14 |
| 6,312,322 B1 * | 11/2001 | Chang | ................ | B24B 23/03 |
| | | | | 451/344 |
| 6,390,205 B2 * | 5/2002 | Wallgren | ................ | B25B 21/00 |
| | | | | 173/4 |
| 6,394,717 B1 * | 5/2002 | Mazaki | ................ | B28D 1/041 |
| | | | | 408/124 |
| 6,401,837 B1 * | 6/2002 | Pan | ................ | B25F 3/00 |
| | | | | 173/217 |
| 6,463,824 B1 * | 10/2002 | Prell | ................ | B25F 3/00 |
| | | | | 173/29 |
| 6,464,588 B1 * | 10/2002 | Rupp | ................ | F16F 1/16 |
| | | | | 464/179 |
| 6,516,896 B1 * | 2/2003 | Bookshar | ............. | B23P 19/066 |
| | | | | 173/217 |
| 6,546,596 B2 * | 4/2003 | Grote | ................ | B05C 17/0205 |
| | | | | 16/113.1 |
| 6,571,479 B1 | 6/2003 | Wu | | |
| 6,581,697 B1 * | 6/2003 | Giardino | ............. | B25B 23/0021 |
| | | | | 173/171 |
| 6,701,623 B2 | 3/2004 | Sanders | | |
| 6,928,903 B1 * | 8/2005 | Liao | ................ | B25G 1/063 |
| | | | | 81/58.3 |
| 6,938,587 B2 | 9/2005 | Thomas et al. | | |
| 6,997,633 B2 | 2/2006 | Thomas et al. | | |
| 7,004,668 B2 * | 2/2006 | Lombardo | ................ | F16C 1/08 |
| | | | | 403/333 |
| 7,241,117 B2 * | 7/2007 | Baer | ................ | H02K 15/00 |
| | | | | 417/423.15 |
| 7,278,342 B1 * | 10/2007 | Chang | ................ | F16D 3/20 |
| | | | | 81/177.85 |
| 7,300,077 B2 * | 11/2007 | Tawara | ................ | B25G 3/26 |
| | | | | 403/378 |
| 7,403,733 B2 * | 7/2008 | Watanabe | ........... | G03G 21/1647 |
| | | | | 399/167 |
| 7,739,800 B2 | 6/2010 | Hurley et al. | | |
| 8,109,183 B2 * | 2/2012 | Santamarina | ....... | B25B 23/1405 |
| | | | | 81/477 |
| 8,220,366 B1 * | 7/2012 | Fierro | ................ | B25B 13/06 |
| | | | | 81/177.85 |
| 8,381,834 B2 * | 2/2013 | Barhitte | ................ | B25F 5/00 |
| | | | | 173/214 |
| 8,485,488 B2 * | 7/2013 | Forrest | ................ | A47C 7/002 |
| | | | | 248/407 |
| 8,695,223 B2 * | 4/2014 | Ito | ................ | A01D 34/90 |
| | | | | 30/277.4 |
| 9,144,891 B2 * | 9/2015 | Khangar | ................ | B25G 1/043 |
| 9,333,636 B2 | 5/2016 | Yamada et al. | | |
| 9,556,914 B2 | 1/2017 | Dupere | | |
| 10,022,126 B2 * | 7/2018 | Sgroi, Jr. | ........... | A61B 17/1155 |
| 10,085,744 B2 * | 10/2018 | Williams | ............. | A61B 17/068 |
| 10,117,655 B2 * | 11/2018 | Scirica | ................ | A61B 17/068 |
| 10,117,656 B2 * | 11/2018 | Sgroi, Jr. | ............. | A61B 17/1155 |
| 10,188,044 B1 * | 1/2019 | Blackburn, Jr. | ....... | B23D 49/16 |
| 10,350,743 B2 | 7/2019 | Fu et al. | | |
| 10,441,120 B1 * | 10/2019 | Sgroi, Jr | ................ | B25G 1/04 |
| 11,027,400 B2 * | 6/2021 | Raskin | ................ | F16D 1/10 |
| 11,116,122 B2 | 9/2021 | Bermudez | | |
| 2002/0134811 A1 * | 9/2002 | Napier | ................ | B24B 23/04 |
| | | | | 227/134 |
| 2003/0228831 A1 * | 12/2003 | Hsiao | ................ | B24B 23/02 |
| | | | | 451/294 |
| 2004/0074344 A1 * | 4/2004 | Carroll | ................ | B25B 23/0021 |
| | | | | 81/121.1 |
| 2004/0083858 A1 * | 5/2004 | Carnesi | ................ | B25G 1/005 |
| | | | | 81/63 |
| 2004/0093992 A1 * | 5/2004 | Wojtynek | ................ | B25B 13/467 |
| | | | | 81/57.3 |
| 2004/0094663 A1 * | 5/2004 | McVaugh | ................ | B64F 1/22 |
| | | | | 244/50 |
| 2005/0016744 A1 * | 1/2005 | Miyakawa | ................ | E02F 3/966 |
| | | | | 173/124 |

(56) References Cited

U.S. PATENT DOCUMENTS

| | | | |
|---|---|---|---|
| 2005/0135890 A1* | 6/2005 | Bauman | B23B 51/12 408/239 R |
| 2006/0102697 A1* | 5/2006 | Nagai | F16H 25/2021 228/101 |
| 2008/0236124 A1 | 10/2008 | Heinzelmann | |
| 2008/0272172 A1* | 11/2008 | Zemlok | A61B 17/105 227/181.1 |
| 2010/0054853 A1 | 3/2010 | Jesse | |
| 2011/0186316 A1* | 8/2011 | Barhitte | B25F 5/00 173/29 |
| 2011/0188928 A1* | 8/2011 | West | B23P 11/00 403/291 |
| 2012/0103644 A1* | 5/2012 | Walsh | A01B 1/026 173/126 |
| 2012/0255749 A1* | 10/2012 | Seith | B25B 21/02 173/90 |
| 2013/0142563 A1 | 6/2013 | Sumi et al. | |
| 2014/0208598 A1 | 7/2014 | Morita et al. | |
| 2014/0208599 A1* | 7/2014 | Nagahama | A01D 34/90 173/217 |
| 2015/0053749 A1* | 2/2015 | Shelton, IV | G16H 40/63 227/181.1 |
| 2015/0075830 A1* | 3/2015 | Zhang | B24B 23/022 173/213 |
| 2015/0217431 A1* | 8/2015 | Seith | B25B 21/02 81/121.1 |
| 2015/0217433 A1* | 8/2015 | Seith | B25B 23/0035 81/124.6 |
| 2015/0272575 A1* | 10/2015 | Leimbach | A61B 90/96 227/175.3 |
| 2016/0062300 A1* | 3/2016 | Takagi | G03G 15/757 464/157 |
| 2016/0120586 A1* | 5/2016 | Spycher | A61B 17/32 606/41 |
| 2016/0192934 A1* | 7/2016 | Williams | A61B 17/1155 29/451 |
| 2016/0199073 A1* | 7/2016 | Nino | A61B 17/3496 606/184 |
| 2016/0258489 A1 | 9/2016 | Yao | |
| 2017/0028537 A1* | 2/2017 | McClung | B25B 21/026 |
| 2017/0066119 A1 | 3/2017 | Fu et al. | |
| 2018/0117752 A1 | 5/2018 | Weber et al. | |
| 2018/0333169 A1* | 11/2018 | Leimbach | H02J 5/00 |
| 2018/0345475 A1* | 12/2018 | Qian | B25F 5/02 |
| 2018/0355919 A1* | 12/2018 | Livengood | A01B 71/06 |
| 2019/0270188 A1* | 9/2019 | Zhang | B25B 23/0035 |
| 2019/0293041 A1* | 9/2019 | Dong | B25F 5/001 |
| 2019/0358801 A1* | 11/2019 | McCue | B25F 3/00 |
| 2021/0078151 A1* | 3/2021 | Huber | B25F 5/001 |
| 2024/0123593 A1* | 4/2024 | Sattler | B23D 47/12 |

FOREIGN PATENT DOCUMENTS

| | | |
|---|---|---|
| CN | 103477787 A | 1/2014 |
| CN | 204180544 U | 3/2015 |
| CN | 106499935 A | 3/2017 |
| CN | 106914864 A | 7/2017 |
| CN | 106914866 A | 7/2017 |
| CN | 106921263 A | 7/2017 |
| CN | 109089524 A | 12/2018 |
| CN | 209201539 U | 8/2019 |
| DE | 29809694 U1 | 7/1998 |
| DE | 29907780 U1 | 7/1999 |
| DE | 19808450 A1 | 9/1999 |
| DE | 102015207151 A1 | 10/2016 |
| GB | 2320665 A | 7/1998 |
| WO | WO2010037159 A1 | 4/2010 |

* cited by examiner

WORK TOOL AND TRANSMISSION SYSTEM THEREOF

This application claims the benefit of priority to Chinese Patent Application No. 202111621547.X, filed on Dec. 28, 2021, the disclosure of which is incorporated by reference herein in its entirety.

TECHNICAL FIELD

The present invention relates to a work tool and a transmission system thereof, in particular a transmission system for an outdoor electric tool.

BACKGROUND ART

Work tools are used for various tasks, such as trimming hedges, cutting branches, blowing leaves, etc. Users generally need to use specific tools for different tasks, e.g. hedge trimmers, chainsaws, blowers, etc. To increase work tools' adaptability to different types of tasks, some manufacturers have designed separable electric tools, which include a universal motive power head and several types of interchangeable working heads. Separable electric tools can significantly reduce user costs, and are easy to transport and store. Because the motive power head and the working head are separate from one another, such electric tools use a transmission shaft to transmit motive power outputted by the motive power head to the working head, the transmission shaft generally being disposed in a tube connecting the motive power head to the working head. Thus, when changing the working head, a user not only needs to lock the connection between the tube at the motive power head side and the tube of the working head, but also needs to ensure that a transmission connection is established between the transmission shaft at the motive power head side and the transmission shaft at the working head side. This introduces high requirements for the user operation of changing the working head.

SUMMARY OF THE INVENTION

In one aspect, the present invention provides a transmission system for a work tool, comprising: a first shaft; a second shaft, a near end thereof having a first mating part; and a shaft coupler, a far-side part thereof having a second mating part matched in shape to the first mating part. The transmission system further comprises a coupling mechanism capable of directly or indirectly applying a coupling force to at least one of the first shaft, the second shaft and the shaft coupler. When the far-side part of the shaft coupler is aligned with the near end of the second shaft in the circumferential direction, the coupling force forces the first mating part to engage with the second mating part, so that the shaft coupler transmits rotational movement of the first shaft to the second shaft.

In one embodiment, a near-side part of the shaft coupler comprises a first shaft hole for accommodating a far end of the first shaft. The far-side part of the shaft coupler comprises a second shaft hole for accommodating the near end of the second shaft. The near-side part (610) of the shaft coupler and the far end (252) of the first shaft may be fixedly connected in such a way as to be unable to move relative to each other, or may be connected in such a way as to be movable relative to each other in the axial direction.

In one embodiment, the far-side part of the shaft coupler further comprises a guide channel located between a far-end opening of the shaft coupler and the second shaft hole. A cross section of the guide channel gradually decreases in size from the far-end opening towards the second shaft hole. At least part of the guide channel may be a helical channel.

In one embodiment, the coupling mechanism comprises a first biasing element arranged at least partially around the far end of the first shaft. When the far-side part of the shaft coupler and the near end of the second shaft are in contact with each other but not aligned in the circumferential direction, the second shaft can push the shaft coupler to move towards the near side, while compressing the first biasing element. Once the far-side part of the shaft coupler has rotated to a position in which it is aligned with the near end of the second shaft in the circumferential direction, the shaft coupler moves towards the far side under the action of an axial biasing force applied by the first biasing element, causing the near end of the second shaft to enter the second shaft hole.

In one embodiment, the coupling mechanism comprises a second biasing element arranged at least partially around a near end of the first shaft, and when the far-side part of the shaft coupler and the near end of the second shaft are in contact with each other but not aligned in the circumferential direction, the second shaft can push the first shaft to move towards the near side, while compressing the second biasing element. Once the far-side part of the shaft coupler has rotated to a position in which it is aligned with the near end of the second shaft in the circumferential direction, the first shaft moves towards the far side under the action of an axial biasing force applied by the second biasing element and drives the shaft coupler to move towards the far side, causing the near end of the second shaft to enter the second shaft hole.

In one embodiment, the transmission system comprises: a first tube, at least part of the first shaft being located in the first tube and rotatable relative to the first tube; a second tube, at least part of the second shaft being located in the second tube and rotatable relative to the second tube; a tube connector for connecting the first tube and the second tube, at least part of the shaft coupler being located in the tube connector. The transmission system further comprises a locking mechanism, comprising a positioning pin and a positioning hole, one of the positioning pin and positioning hole being located on the first tube or second tube, and the other being located on the tube connector. When the positioning pin enters or passes through the positioning hole, relative movement between the first tube or second tube and the tube connector is prevented, and the locking mechanism is in a locked position.

In one embodiment, the positioning pin is mounted on the second tube by means of a biasing component, and when the locking mechanism is in the locked position, the positioning pin extends through a hole formed in the second tube. The biasing component is pivotably mounted on the second tube by means of a fastener. The fastener comprises a protruding part located outside an outer wall of the second tube. The tube connector may comprise a guide groove formed on an inner wall of the tube connector, the dimensions of the guide groove being designed to be suitable for accommodating and guiding the protruding part of the fastener.

In one embodiment, an inner wall of the tube connector defines a first connecting channel and a second connecting channel. The first connecting channel is used to receive a far end of the first tube, the second connecting channel is used to receive a near end of the second tube, and the first connecting channel and second connecting channel are separated by a flange. When mounting is complete, the near-side part of the shaft coupler is located in the first connecting channel, and the far-side part of the shaft coupler is located in the second connecting channel.

In one embodiment, the coupling mechanism comprises a first spring, which has one end connected to the shaft coupler and another end connected to a first stop member. The first stop member is fixed in the axial direction relative to the first tube. When the far-side part of the shaft coupler and the near end of the second shaft are in contact with each other but not aligned in the circumferential direction, the second shaft can push the shaft coupler to move towards the near side, while compressing the first spring. The first stop member may be positioned at a far end of a first bearing unit in the axial direction.

In one embodiment, the near end of the first shaft is transmission-connected to a motive power output end of a motive power head. The motive power output end comprises a sleeve, which defines a third shaft hole matched in shape to the near end of the first shaft, and the near end of the first shaft is able to move in the third shaft hole. The coupling mechanism comprises a second spring, which has one end connected to the sleeve, and another end fixed to the first shaft or connected to a second stop member fixed to the first shaft. When the far-side part of the shaft coupler and the near end of the second shaft are in contact with each other but not aligned, the second shaft can push the first shaft so that the near end thereof moves in the third shaft hole towards the near side, while compressing the second spring. Once the far-side part of the shaft coupler has rotated to a position in which it is aligned with the near end of the second shaft in the circumferential direction, the near end of the first shaft moves in the third shaft hole towards the far side under the action of an axial biasing force applied by the second spring. The second stop member may be positioned at a near end of a first bearing unit in the axial direction.

In another aspect, the present invention provides a work tool, comprising: the transmission system described above; a motive power head, comprising a motor, an output shaft of the motor being transmission-connected to the first shaft; and a working head, transmission-connected to the second shaft. The work tool may further comprise a control unit and a sensing unit. The control unit controls the motor to run in a coupling mode or a working mode, a maximum motor rotation speed in the coupling mode being less than 50% of a minimum motor rotation speed in the working mode. When the sensing unit detects that rotation of the first shaft is transmitted to the second shaft, the control unit may control the motor to run in the working mode. If the sensing unit does not detect within a predetermined time that the rotation of the first shaft is transmitted to the second shaft, the control unit may stop the motor.

DETAILED DESCRIPTION OF EMBODIMENTS

Figure 1:
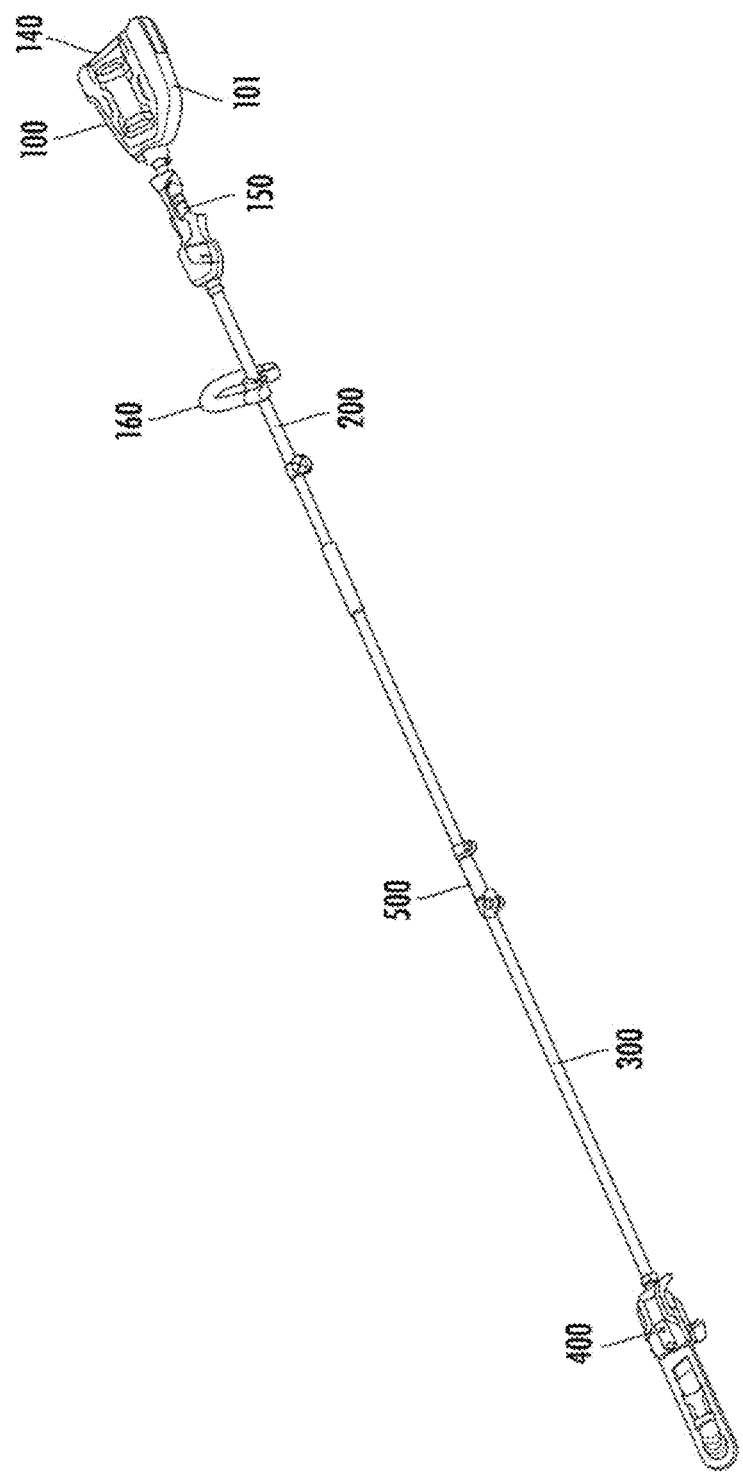
FIG. 1 shows a work tool according to an embodiment of the present invention.

FIG. 1 shows a work tool according to an embodiment of the present invention. The work tool is an electric tool, comprising a motive power head 100, a working head 400, and a tube assembly connecting the two heads. The tube assembly comprises a first tube 200, a second tube 300, and a tube connector 500 for connecting the first tube 200 and second tube 300. For ease of description, a side facing the motive power head 100 is called the near side, and a side facing the working head 400 is called the far side herein. In this embodiment, the near side of the first tube 200 is connected to the motive power head 100, and the far side of the second tube 300 is connected to the working head 400.

The working head 400 shown in FIG. 1 is a chainsaw. By using the tube assembly to connect the chainsaw to the motive power head 100, the user will obtain a pole chainsaw (pole saw). The working head 400 can be replaced; different working heads are suitable for carrying out different tasks. For example, the working head may comprise a hedge trimmer, a strimmer, a blower, a cultivator, a drill bit, etc. Advantageously, the motive power head 100 is designed to be universal, and can provide motive power for various types of working head 400. The motive power head 100 in FIG. 1 has a power supply receiving part 140 for receiving a power supply. The power supply comprises at least one battery pack removably fitted to the power supply receiving part 140, e.g. a rechargeable lithium battery pack; the nominal voltage of the battery pack may be chosen according to the type of working head 400, including but not limited to 9V, 12V, 18 V, 24 V, 40 V, 48 V, 60 V and 80 V.

A motor is provided in a housing 101 of the motive power head 100, for driving the working head 400. The housing 101 may also accommodate a control unit for controlling the motor, e.g. a printed circuit board assembly. To help the motor and/or control unit to dissipate heat, at least one vent hole may be provided on the housing 101, for introducing cooling air and discharging the cooling air heated by the motor and/or control unit. Optionally, a fan and/or a heat sink is provided in the housing 101 to further improve heat dissipating ability.

The work tool shown in FIG. 1 comprises two handles, both mounted on the first tube 200. A first handle 150 is used as a main handle, and is close to the motive power head 140. At least one control element is provided on the first handle 150, e.g. a trigger, a push-button or a rotary knob. The second handle 160 is used as an auxiliary handle, and the position and/or direction thereof relative to the first tube 200 is adjustable, to enable the user to grip the work tool securely. In one embodiment, at least one of the first tube 200 and second tube 300 is telescopic, to allow the user to change the overall length of the work tool according to different application scenarios.

Figure 2:
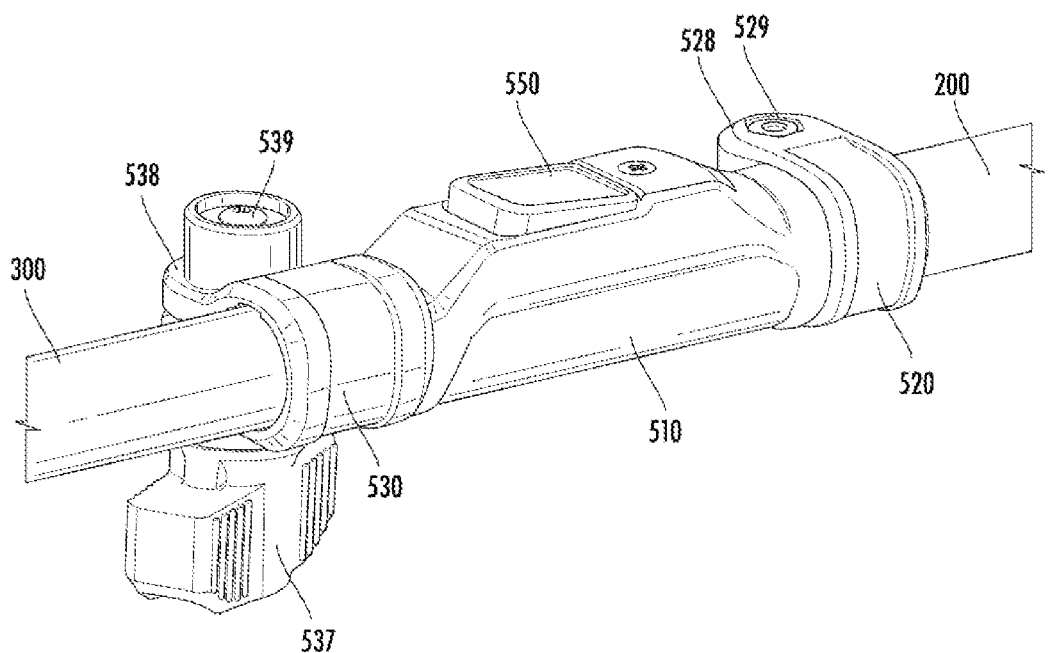
FIG. 2 shows a tube connector according to an embodiment of the present invention.

FIG. 2 shows an embodiment of the tube connector 500. The tube connector 500 comprises a tubular body 510, a first clamping part 520 located at a near end of the tubular body 510, and a second clamping part 530 located at a far end of the tubular body 510. The first clamping part 520 comprises a first pair of clamping arms 528 for clamping the first tube 200, and a first fastener 529 for locking the first pair of clamping arms 528. The second clamping part 530 comprises a second pair of clamping arms 538 for clamping the second tube 300, and a second fastener 539 for locking the second pair of clamping arms 538. The first and second fasteners 529, 539 may be threaded fasteners.

In this embodiment, the tube connector 500 is generally fixedly connected to the first tube 200, i.e. the first pair of clamping arms 528 keeps the first tube 200 clamped. If the user wishes to withdraw the first tube 200, he or she needs to use a specific tool (e.g. a screwdriver or wrench) to loosen or remove the first fastener 529. This can avoid loosening of the connection between the first tube 200 and the tube connector 500. In other embodiments, the tube connector 500 may be permanently fixed to a far end of the first tube 200. Further, to make it easy for the user to change the working head 400, an operating member 537 is provided on the second clamping part 530 of the tube connector 500. The operating member 537 may be a clamping rotary knob that interacts with the second fastener 539; by turning the clamping rotary knob, the user adjusts the clamping force applied to the second tube 300 by the second pair of clamping arms 538.

Figure 3A:
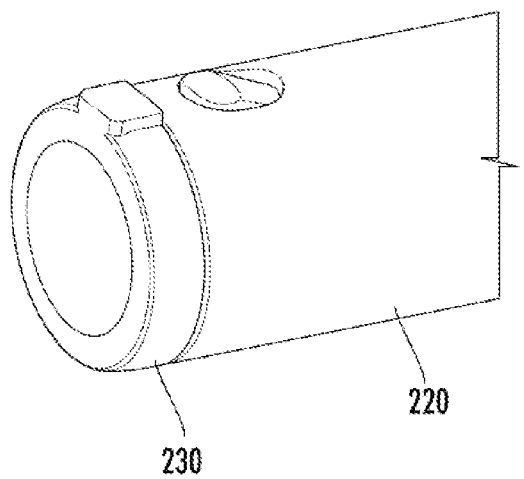
FIG. 3A shows the far end of the first tube according to an embodiment of the present invention.
Figure 3B:
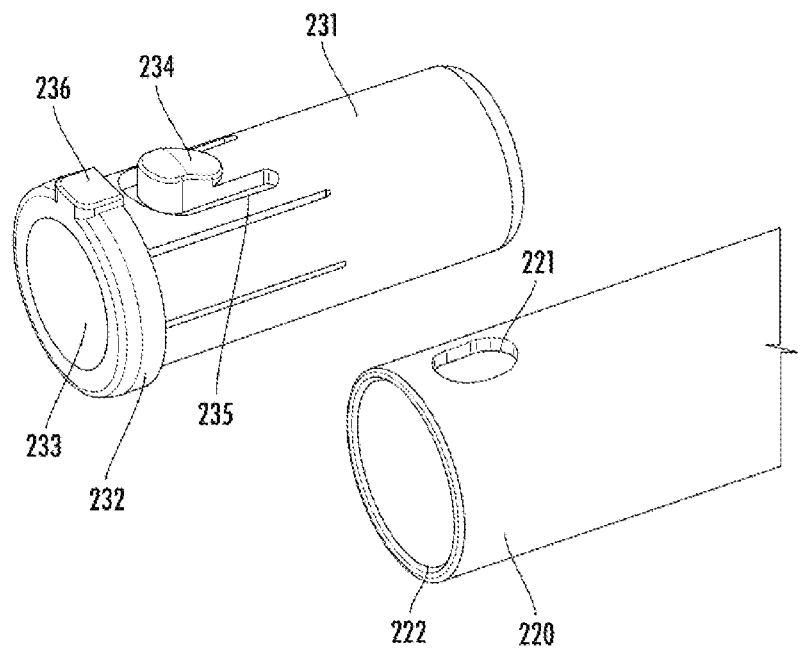
FIG. 3B shows the first tube and the sleeve fitted to the far end thereof.

FIG. 3A shows the far end 220 of the first tube 200, with a sleeve 230 fitted thereto. FIG. 3B shows the sleeve 230, comprising a tubular body 231 defining a through-hole 233. A far end of the tubular body 231 has a flange 232, with a key 236 that extends radially outwards being formed thereon. A protruding snap-fit part 234 is formed on an outer surface of the tubular body 231, and a U-shaped gap 235 is formed around the snap-fit part. The height to which the snap-fit part 234 protrudes from the outer surface of the tubular body 231 gradually decreases towards the near side. When the sleeve 230 is inserted into the far end 220 of the first tube 200, the snap-fit part 234 moves inwards under pressure from the tube wall, until the snap-fit part 234 enters an opening 221 formed in the tube wall. When assembly is complete, the flange 232 abuts an edge 222 of the far end 220 of the first tube.

Figure 4:
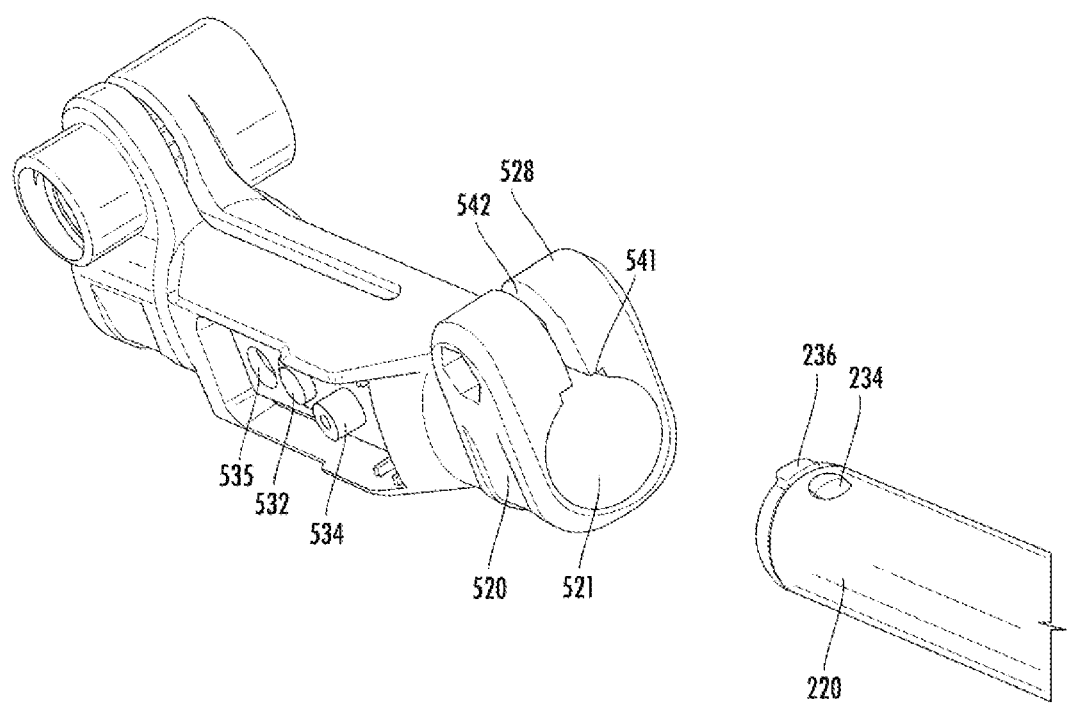
FIG. 4 shows the tube connector and the far end of the first tube.

FIG. 4 shows the tube connector 500 and the far end 220 of the first tube 200. An inner wall of the tube connector 500 defines a first connecting channel 521, for receiving the far end 220 of the first tube 200. In this embodiment, the first connecting channel 521 comprises a longitudinally extending keyway 541. When the far end 220 of the first tube 200 is inserted into the first connecting channel 521, the keyway 541 is used to guide the key 236 on the flange 232. The fit between the keyway 541 and the key 236 can prevent rotation of the first tube 200 relative to the tube connector 500. The keyway 541 may be in communication with a gap 542 between the first pair of clamping arms 528, and the width of the keyway 541 is slightly greater than the width of the key 236. When the first pair of clamping arms 528 clamp the first tube 200 under the action of the first fastener 529, the width of the keyway 541 is reduced, and the key 236 accommodated therein is squeezed. The arrangement whereby the keyway 541 acts on the key 236 as part of the first pair of clamping arms 528 prevents a gap from appearing between the keyway 541 and the key 236 when assembly is complete. In other embodiments, the keyway 541 may be disposed at another position on the inner wall of the tube connector 500. It should be understood that the fit between the keyway 541 and the key 236 is not necessary; any suitable method may be used to achieve a fixed connection between the far end 220 of the first tube 200 and the tube connector 500.

To prevent detachment of the second tube 300 from the tube connector 500 in the process of using the work tool, for example loosening of the operating member 537 due to shocks, a locking mechanism is advantageously provided for the tube assembly. Even if the second pair of clamping arms 538 are unable to apply a sufficient clamping force to the second tube 300, the locking mechanism can ensure a locked connection between the second tube 300 and the tube connector 500. In this embodiment, the locking mechanism comprises a positioning pin and a positioning hole; one of the positioning pin and positioning hole is located on the second tube 300, while the other is located on the tube connector 500. When the positioning pin enters or passes through the positioning hole, relative movement between the second tube 300 and the tube connector 500 is prevented, and the locking mechanism is in a locked position.

Figure 5A:
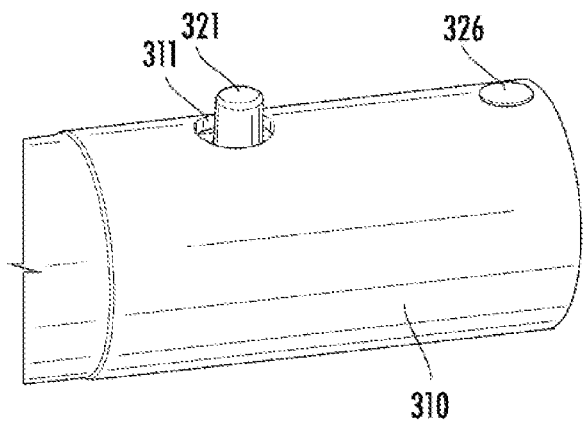
FIG. 5A shows the near end of the second tube according to an embodiment of the present invention.
Figure 5B:
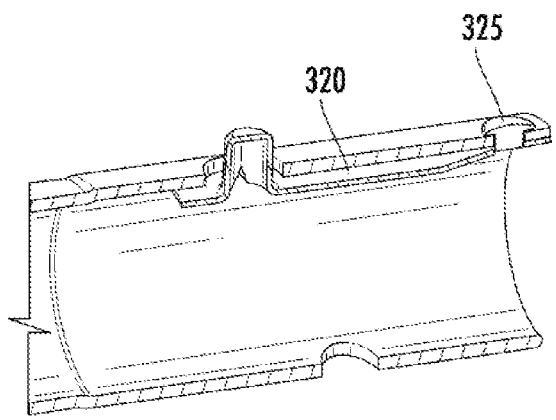
FIG. 5B shows a cross section of the near end of the second tube.

FIG. 5A shows a near end 310 of the second tube 300. A hole 311 is formed in the tube wall at the near end 310, for receiving the positioning pin 321 of the locking mechanism. When the locking mechanism is in the locked position, the positioning pin 321 extends through the hole 311. FIG. 5B shows a cross section of the near end 310 of the second tube 300. The positioning pin 321 is mounted on the second tube 300 by means of a biasing component 320. The biasing component 320 applies a biasing force to the positioning pin 321 so that the positioning pin 321 passes through the hole 311. When the positioning pin 321 is subjected to pressure, it can move downwards into the second tube 300.

Figure 5C:
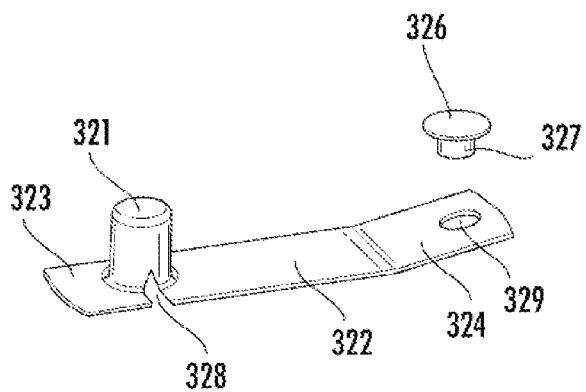
FIG. 5C shows the biasing component and the positioning pin mounted at the near end of the second tube.

FIG. 5C shows an embodiment of the biasing component 320. The biasing component 320 comprises a sheet-like body, preferably a flat spring; a far end thereof is connected to the positioning pin 321, and a fastener hole 329 is formed at a near end. The biasing component 320 is pivotably mounted on the second tube 300 by means of a fastener 325. The fastener 325 comprises a body 327 and a protruding part 326; the body 327 extends through the fastener hole 329, and the protruding part 326 is located outside an outer wall of the second tube 300. This embodiment uses a rivet as the fastener 325, with a head of the rivet forming the protruding part 326. The sheet-like body of the biasing component 320 comprises three parts; the first part 322 and the second part 323 are located at two sides of the positioning pin 321 respectively, with a gap 328 therebetween. The third part 324 is arranged at an angle with respect to the first and second parts 322, 323, and the fastener hole 329 is formed in the third part 324. Although the positioning pin 321 in FIG. 5C is integrally formed with the biasing component 320, the two parts may also be independent components. In other embodiments, the biasing component 320 may be an annular spring, a conical spring, a coil spring, etc.

Figure 6:
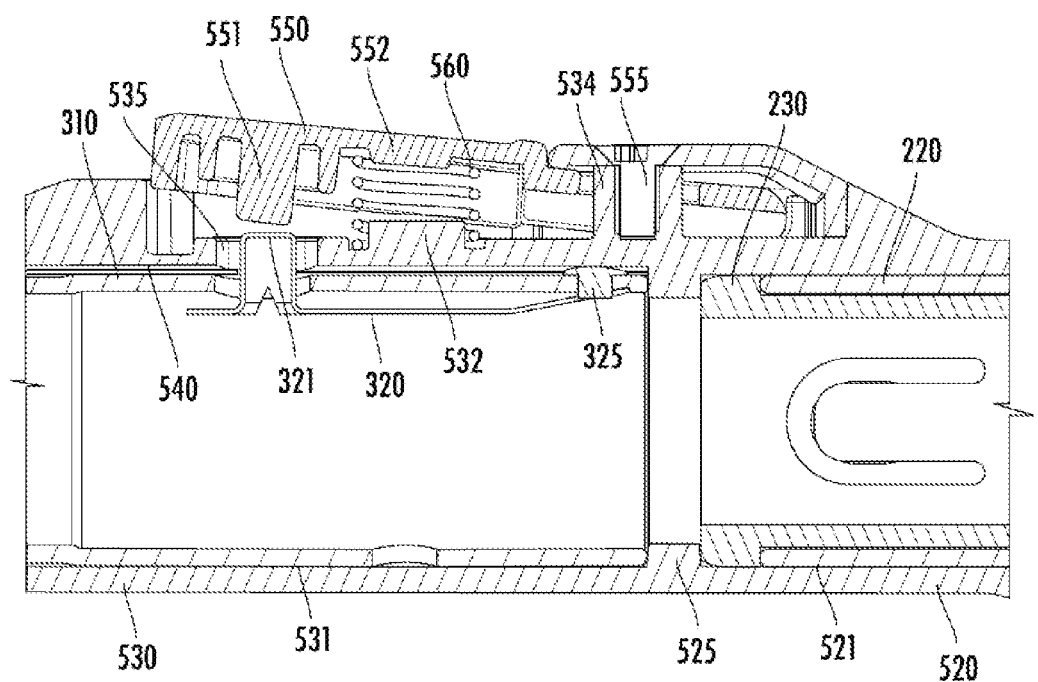
FIG. 6 shows a cross section of the tube connector.

FIG. 6 shows a cross section of the tube connector 500. The inner wall of the tube connector 500 defines the first connecting channel 521 and a second connecting channel 531. The first connecting channel 521 is used to receive the far end 220 of the first tube 200; the second connecting channel 531 is used to receive the near end 310 of the second tube 300. The first connecting channel 521 is separated from the second connecting channel 531 by a flange 525, which extends radially inwards from the inner wall. When assembly is complete, the sleeve 230 on the far end 220 of the first tube abuts one side of the flange 525, and the near end 310 of the second tube abuts the other side of the flange 525.

The tube connector 500 has a hole 535, which is used as the positioning hole of the locking mechanism. The positioning hole 535 is in communication with the second connecting channel 531, and located at a position aligned with the positioning pin 321. When the user inserts the near end 310 of the second tube 300 into the second connecting channel 531, the positioning pin 321 on the second tube 300 is subjected to pressure from the inner wall of the tube connector 500, and this pressure overcomes the biasing force of the biasing component 320 to cause the positioning pin 321 to enter the second connecting channel 531. When the near end 310 of the second tube 300 is inserted to a predetermined position, the positioning pin 321 is aligned with the positioning hole 535, and the positioning pin 321 passes through the positioning hole 535 under the action of the biasing force, thereby achieving locking between the second tube 300 and the tube connector 500.

The locking mechanism of the tube assembly further comprises an unlocking element 550, which is shown in FIGS. 2 and 6. The unlocking element 550 may be a mechanical push-button disposed at the outside of the tube connector 500. When the unlocking element 550 is actuated, it forces the positioning pin 321 to leave the positioning hole 535 and enter the second connecting channel 531, allowing the user to remove the second tube 300 from the tube connector 500. In the embodiment shown in FIG. 6, the unlocking element 550 is pivotably connected to the tube connector 500 and comprises an unlocking protrusion 551 which interacts with the positioning pin 321. A return member 560, e.g. a spring, may be disposed between an outer wall of the tube connector 500 and an inner wall of the unlocking element 550. The return member 560 has one end connected to a first mounting seat 552 on the unlocking element 550, and another end connected to a second mounting seat 532 on the tube connector 500. A fastener mounting part 534 may also be provided on the outer wall of the tube connector 500, for accommodating a fastener 555. FIG. 4 shows the positions of the positioning hole 535, the second mounting seat 532 and the fastener mounting part 534 on the tube connector 500.

Figure 7:
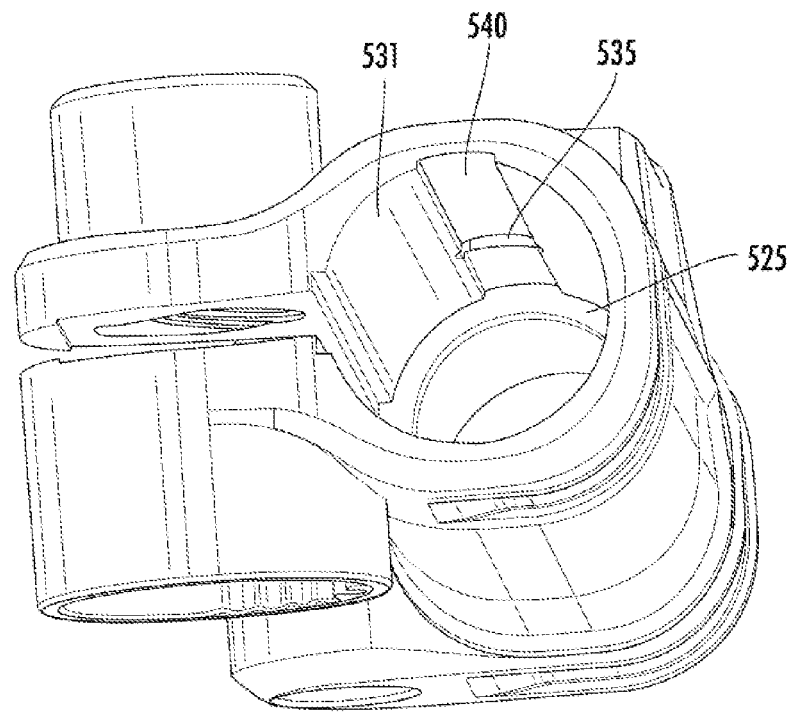
FIG. 7 shows the far side of the tube connector.

FIG. 7 shows the far side of the tube connector 500. From the angle of view in FIG. 7, it is possible to see the flange 525, the positioning hole 535, and the second connecting channel 531 defined by the inner wall of the tube connector 500. In addition, a guide groove 540 is further defined on the inner wall, the dimensions thereof being designed to be suitable for accommodating the fastener protruding part 326 shown in FIG. 5A. Before the user inserts the near end 310 of the second tube 300 into the second connecting channel 531, the user needs to first align the fastener protruding part 326 with the guide groove 540; this ensures that the second tube 300 is inserted with the correct orientation. Returning to FIG. 5A, in this embodiment the fastener protruding part 326 and the positioning pin 321 are located at two ends of the flat spring, and are aligned with each other in the axial direction. Thus, the guide groove 540 in FIG. 7 extends along the second connecting channel 531 to the flange 525, and the guide groove 540 is aligned with the positioning hole 535 in the axial direction. The advantage of this arrangement is that the same guide groove 540 can guide the fastener protruding part 326 and the positioning pin 321, so there is no need to provide an additional guide groove for the positioning pin 321.

During operation of the work tool, motive power outputted by the motor in the motive power head 100 needs to be transmitted to the working head 400. The transmission of motive power can be realized by means of a transmission shaft disposed in the tube assembly. A transmission system for the work tool is described below with reference to FIGS. 8-14.

Figure 8:
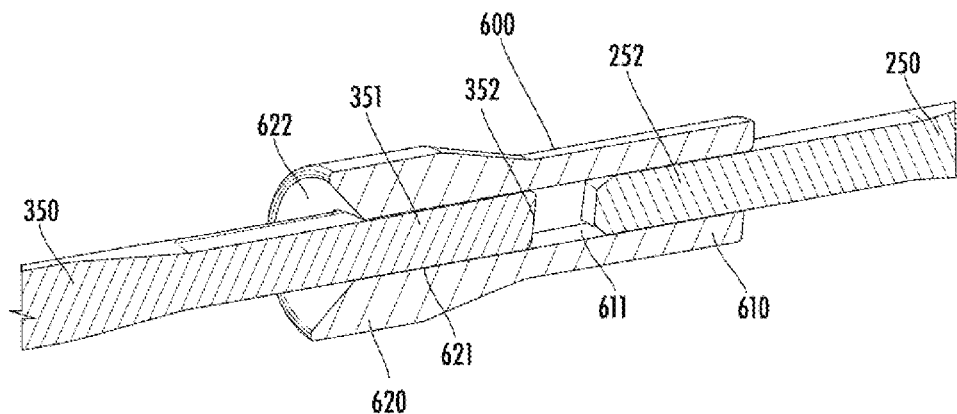
FIG. 8 shows the transmission system of the work tool.

FIG. 8 shows an embodiment of the transmission system. The transmission system comprises a first shaft 250, a second shaft 350, and a shaft coupler 600 for transmission-connecting the first shaft 250 to the second shaft 350. The first shaft 250 is transmission-connected to the motive power head 100, and the second shaft 350 is transmission-connected to the working head 400. The first shaft 250 and second shaft 350 may be single shafts, or may comprise multiple shaft segments transmission-connected to each other. A near-side part 610 of the shaft coupler 600 comprises a first shaft hole 611, for accommodating a far end 252 of the first shaft 250. A far-side part 620 of the shaft coupler 600 comprises a second shaft hole 621, for accommodating a near end 351 of the second shaft 350. In this embodiment, the first shaft hole 611 is in communication with the second shaft hole 621. Alternatively, a separating part may be provided between the first shaft hole 611 and the second shaft hole 621, to limit the depths to which the first shaft 250 and the second shaft 350 extend into the shaft coupler 600.

The near end 351 of the second shaft 350 has a first mating part, and the far-side part 620 of the shaft coupler 600 has a second mating part which is matched in shape to the first mating part. When the first mating part is engaged with the second mating part, the shaft coupler 600 is transmission-connected to the second shaft 350, and rotation of the shaft coupler 600 is transmitted to the second shaft 350. The first mating part may comprise one of the second shaft 350 and the second shaft hole 621 having a non-circular cross section, and the second mating part may comprise the other of the second shaft 350 and the second shaft hole 621 having the noncircular cross section. When the near end 351 of the second shaft 350 is aligned with the far-side part 620 of the shaft coupler 600 in the circumferential direction, the shaft can enter the shaft hole. In the embodiment of FIG. 8, the near end 351 of the second shaft 350 (i.e. the first mating part) is a shaft with a quadrilateral cross section and has an edge 352; the second shaft hole 621 (i.e. the second mating part) is a shaft hole having a matching shape. Similarly, the far end 252 of the first shaft 250 is a shaft with a quadrilateral cross section, and the first shaft hole 611 is a shaft hole having a matching shape. It should be understood that the mating of the shaft coupler 600 with the first and second shafts 250, 350 is not limited to the embodiment shown in the figure; other forms of transmission connection are likewise suitable for the present invention.

Figure 9A:
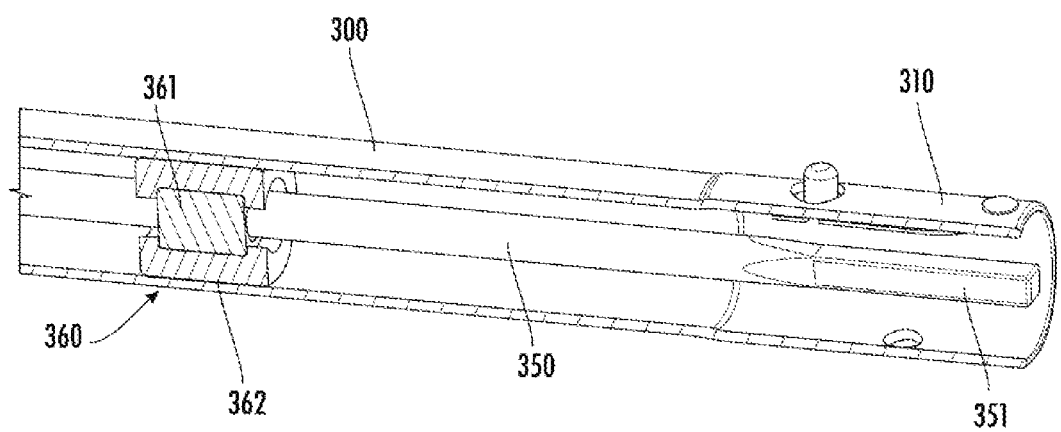
FIG. 9A shows a cross section of the near end of the second tube accommodating the second shaft.

FIG. 9A shows a cross section of the second tube 300. The second shaft 350 is located in the second tube 300, and the near end 351 of the second shaft 350 is substantially flush with the near end 310 of the second tube 300. The second shaft 350 can rotate relative to the second tube 300. In other embodiments, the near end 351 of the second shaft 350 may project from the near end 310 of the second tube 300. To support the rotating second shaft 350 during operation of the work tool, at least one second bearing unit 360 may be provided between the second shaft 350 and an inner wall of the second tube 300.

Figure 9B:
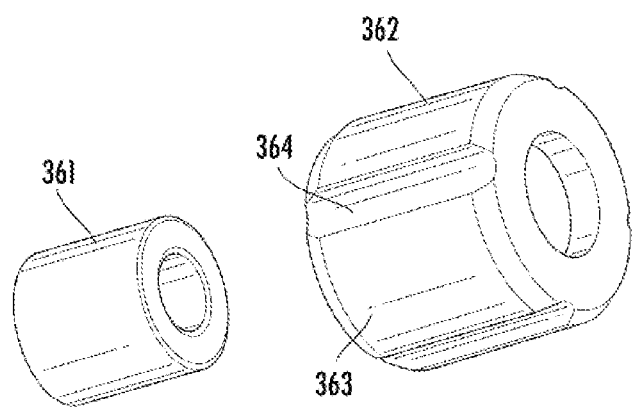
FIG. 9B shows a second bearing unit according to an embodiment of the present invention.

FIG. 9B shows an embodiment of the second bearing unit 360. The second bearing unit 360 comprises an annular bearing 361 and a bearing sleeve 362. The bearing sleeve 362 defines multiple contact faces 363 in contact with the inner wall of the second tube 300, with adjacent contact faces 363 being separated by a groove 364. The bearing sleeve 362 may be formed of an elastic material, e.g. rubber. The bearing sleeve 362 can undergo a certain degree of deformation, so can act as a vibration-isolating component to prevent the vibration generated during rotation of the second shaft 350 from being transmitted to the second tube 300. Preferably, multiple second bearing units 360 spaced apart in the axial direction are provided between the second shaft 350 and the inner wall of the second tube 300. The ratio of the distance between two adjacent second bearing units 360 to the length of the second shaft 350 may be 20%-50%.

Figure 10A:
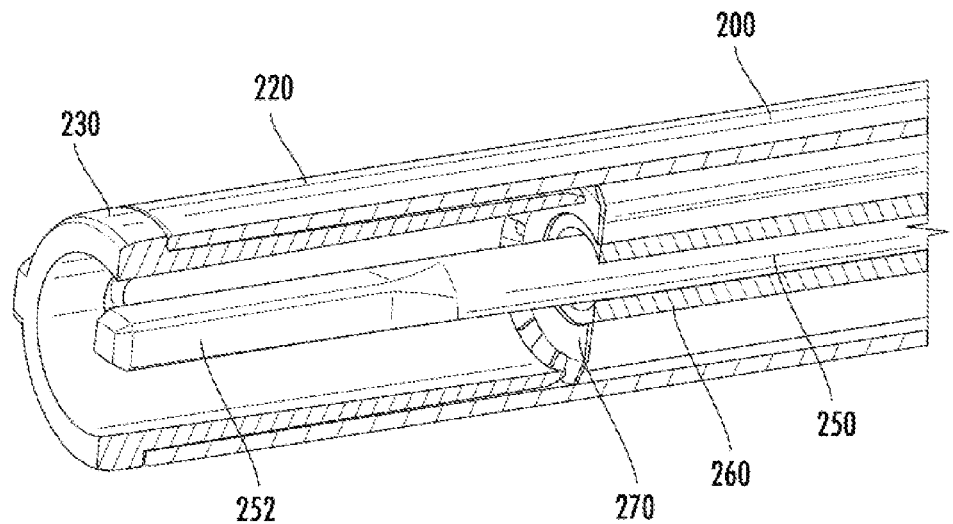
FIG. 10A shows a cross section of the far end of the first tube accommodating the first shaft.
Figure 10B:
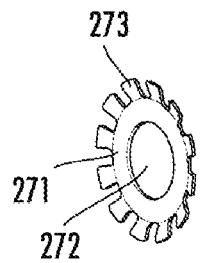
FIG. 10B shows a stop washer.

FIG. 10A shows a cross section of the first tube 200. The first shaft 250 is located in the first tube 200, and the far end 252 of the first shaft 250 is substantially flush with the sleeve 230 mounted on the first tube 200. The first shaft 250 can rotate relative to the first tube 200. In other embodiments, the far end 252 of the first shaft 250 may project from the sleeve 230. To support the rotating first shaft 250, at least one first bearing unit 260 may be provided between the first shaft 250 and an inner wall of the first tube 200. Optionally, a stop washer 270 is provided at an extremity of the first bearing unit 260. FIG. 10B shows the stop washer 270, which comprises a washer body 271 defining a through-hole 272 and multiple teeth 273 extending outwards from the washer body 271.

Figure 10C:
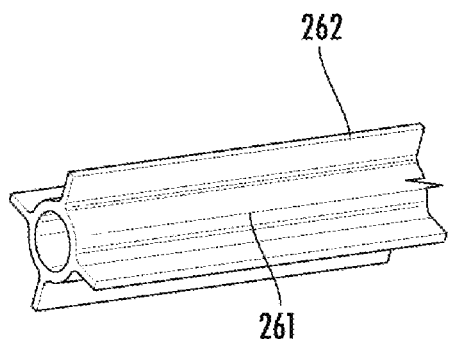
FIG. 10C shows a first bearing unit according to an embodiment of the present invention.
Figure 10D:
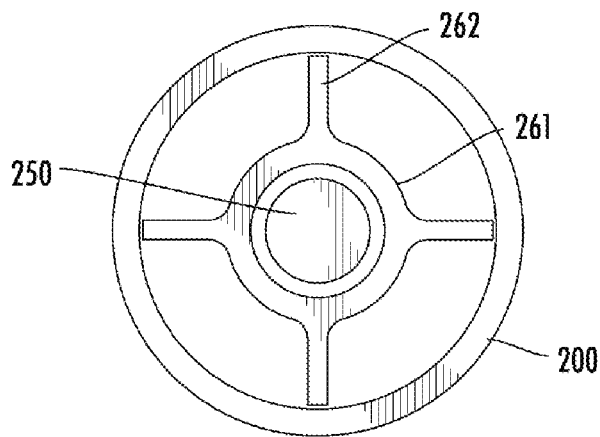
FIG. 10D shows a cross section of the first tube and the first bearing unit.

FIG. 10C-10D show an embodiment of the first bearing unit 260. The first bearing unit 260 comprises a tube part 261, and support strips 262 extending radially outwards from the tube part 261. The first shaft 250 passes through the tube part 261; the multiple support strips 262 are spaced apart in the circumferential direction, with an extremity of each support strip 262 being in contact with the inner wall of the first tube 200. Preferably, the ratio of the radial dimension of the support strip 262 to the inner diameter of the first tube 200 is more than 15% but less than 30%. Unlike the second bearing unit 360 shown in FIGS. 9A-9B, the first bearing unit 260 extends in the axial direction, and can cover most of the length of the first shaft 250. It should be understood that although the first bearing unit 260 for supporting the first shaft 250 and the second bearing unit 360 for supporting the second shaft 350 have been described above with reference to the drawings, the first bearing unit 260 can also be used to support the second shaft 350, and the second bearing unit 360 can also be used to support the first shaft 250.

Figure 11:
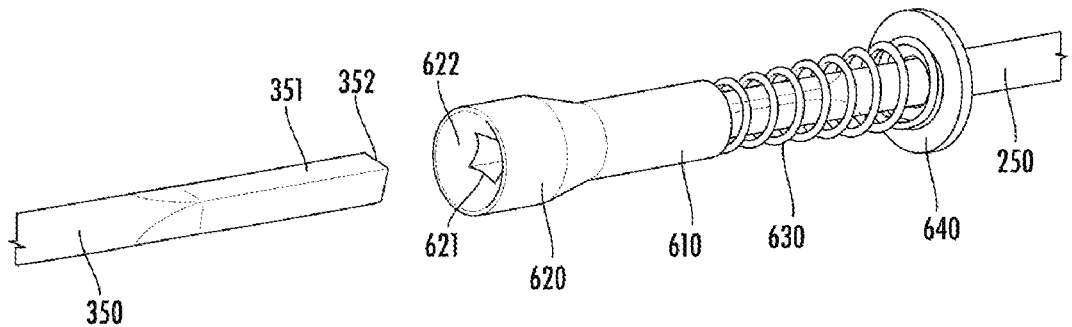
FIG. 11 shows a state of the transmission system according to an embodiment of the present invention before assembly is complete.

FIG. 11 shows a state of the transmission system according to an embodiment of the present invention before assembly is complete. For clarity, the first tube 200, the second tube 300 and the tube connector 500 have been removed from the figure. In this embodiment, the near-side part 610 of the shaft coupler 600 and the far end 252 of the first shaft 250 are fixedly connected in such a way as to be unable to move relative to each other. For example, the far end 252 of the first shaft is press-fitted into the first shaft hole 611, or is fixed in the first shaft hole 611 by means of a fastener, adhesive, etc. Thus, the shaft coupler 600 and the first shaft 250 rotate together and move axially together. In other embodiments, the near-side part 610 of the shaft coupler 600 and the far end 252 of the first shaft 250 are connected in such a way as to be movable relative to each other in the axial direction. A limiting member may be provided in the shaft coupler 600, for defining the maximum distance by which the far end 252 of the first shaft 250 enters the first shaft hole 611.

To complete assembly, the user needs to insert the near end 351 of the second shaft 350 into the second shaft hole 621 of the shaft coupler 600. However, the shaft coupler 600 is located in the tube connector 500, and the user might be unable to see the orientation of the second shaft hole 621 during assembly; this makes it difficult for the user to align the near end 351 of the second shaft 350 with the second shaft hole 621. In addition, as already described above, the user first needs to align the fastener protruding part 326 on the near end 310 of the second tube with the guide groove 540 of the tube connector 500, and then inserts the second tube 300 into the tube connector 500. The second shaft 350 can rotate relative to the second tube 300, so the orientation of the second shaft 350 when assembly is performed is random. Thus, a situation might occur in which a near-end edge 352 of the second shaft 350 cannot be aligned with the second shaft hole 621 in the circumferential direction, and instead contacts an end wall 622 of the shaft coupler 600. In this case, the user needs to manually turn the second shaft 350 and make another attempt at assembly; this process might be repeated several times, affecting the user experience.

To solve this problem, the present invention provides a coupling mechanism for the transmission system, which can achieve automatic alignment with no need for the user to perform an additional operation. Taking FIG. 11 as an example, the coupling mechanism applies a coupling force to the shaft coupler 600, and when the second shaft hole 621 of the shaft coupler 600 is aligned with the near end 351 of the second shaft 350 in the circumferential direction, the coupling force forces the near end 351 of the second shaft 350 to enter the second shaft hole 621, thereby realizing transmission-connection between the second shaft 350 and the shaft coupler 600.

In this embodiment, the coupling mechanism comprises a first biasing element 630. The first biasing element 630 is arranged at least partially around the far end 252 of the first shaft 250, and can apply an axial biasing force to the shaft coupler 600. When the near-end edge 352 of the second shaft contacts the end wall 622 of the shaft coupler, the user can continue to push the second shaft 350 towards the shaft coupler 600. The second shaft 350 then forces the shaft coupler 600 to move towards the near side, while compressing the first biasing element 630. When the second shaft hole 621 is aligned with the near-end edge 352 of the second shaft 350, the shaft coupler 600 moves towards the far side under the action of the axial biasing force applied by the first biasing element 630, such that the near end 351 of the second shaft enters the second shaft hole 621.

The first biasing element 630 in FIG. 11 is a spring (called the first spring hereinbelow), e.g. a conical spring, having one end connected to the shaft coupler 600 and another end connected to a first stop member 640. To enable the first spring 630 to be compressed when the shaft coupler 600 moves towards the near side, the first stop member 640 may be arranged to be fixed in the axial direction relative to the first tube 200. That is to say, when the first shaft 250 moves in the axial direction together with the shaft coupler 600 relative to the first tube 200, the first stop member 640 remains stationary.

Figure 12A:
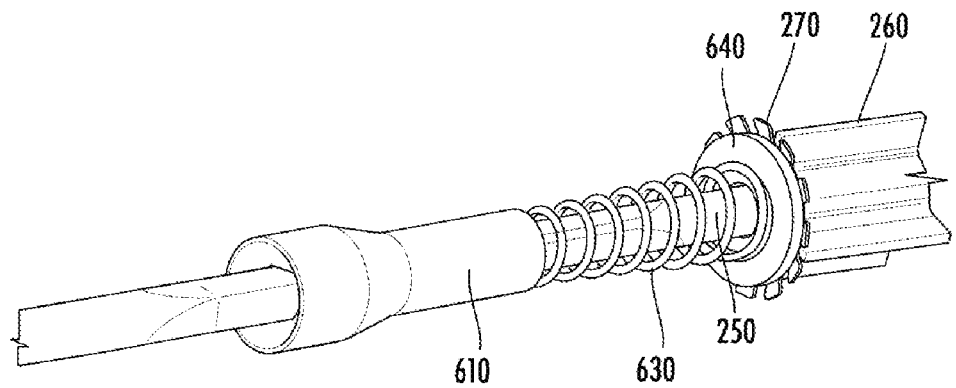
FIG. 12A shows a state of the transmission system after assembly is complete.

FIG. 12A shows a state of the transmission system after assembly is complete. The first stop member 640 is positioned in the axial direction at the far end of the first bearing unit 260, and remains fixed relative to the first tube 200. In this embodiment, the first stop member 640 is located between the far end of the first bearing unit 260 and the near end of the sleeve 230 (shown in FIG. 14). In other embodiments, the first stop member 640 may be fixed to the inner wall of the first tube 200 or fixed to the tubular body 231 of the sleeve 230. It could also be envisaged that the far end of the first bearing unit 260 or the stop washer 260 could be used as the first stop member 640.

Figure 12B:
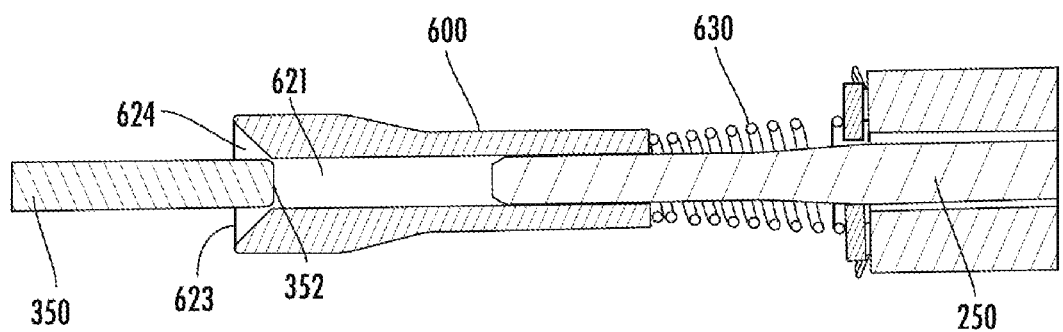
FIG. 12B shows a state of the transmission system when a near-end edge of the second shaft is not aligned with the second shaft hole of the shaft coupler.
Figure 12C:
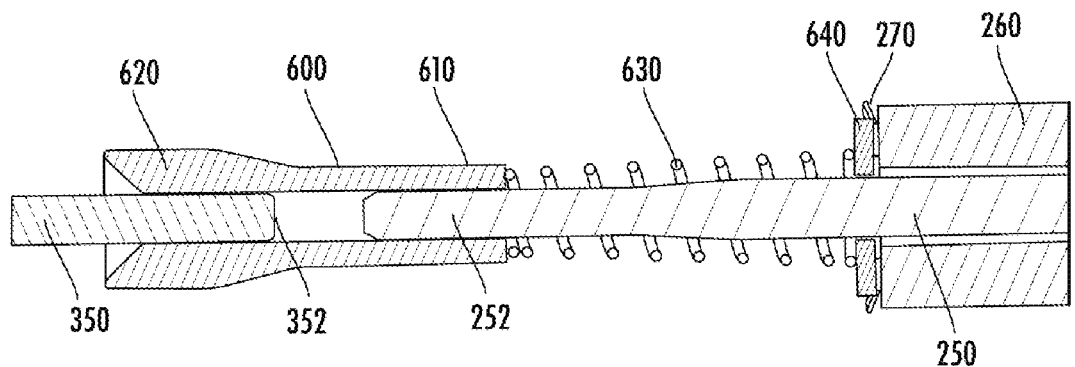
FIG. 12C shows a state of the transmission system after the near-end edge of the second shaft has been aligned with the second shaft hole of the shaft coupler.

FIG. 12B shows a state of the transmission system when the near-end edge 352 of the second shaft 350 is not aligned with the second shaft hole 621 of the shaft coupler 600. The user inserts the second tube 300 into the tube connector 500, and this insertion action causes the second shaft 350 in the second tube 300 to push the shaft coupler 600 and the first shaft 250 to move towards the near side, while compressing the first spring 630. FIG. 12C shows a state of the transmission system after the near-end edge 352 of the second shaft 350 has been aligned with the second shaft hole 621 of the shaft coupler 600. The shaft coupler 600 moves towards the far side under the action of the axial biasing force of the first spring 630, and the near end 351 of the second shaft 350 enters the second shaft hole 621.

The far-side part 620 of the shaft coupler 600 comprises a guide channel 624, which is located between a far-end opening 623 of the shaft coupler and the second shaft hole 621, and is at least partially defined by the end wall 622 of the shaft coupler 600 (shown in FIG. 11). A cross section of the guide channel 624 gradually decreases in size from the far-end opening 623 towards the second shaft hole 621. Advantageously, the guide channel 624 is designed to encourage alignment of the near-end edge 352 of the second shaft 350 with the second shaft hole 621; for example, at least part of the guide channel 624 is a helical channel.

Figure 13:
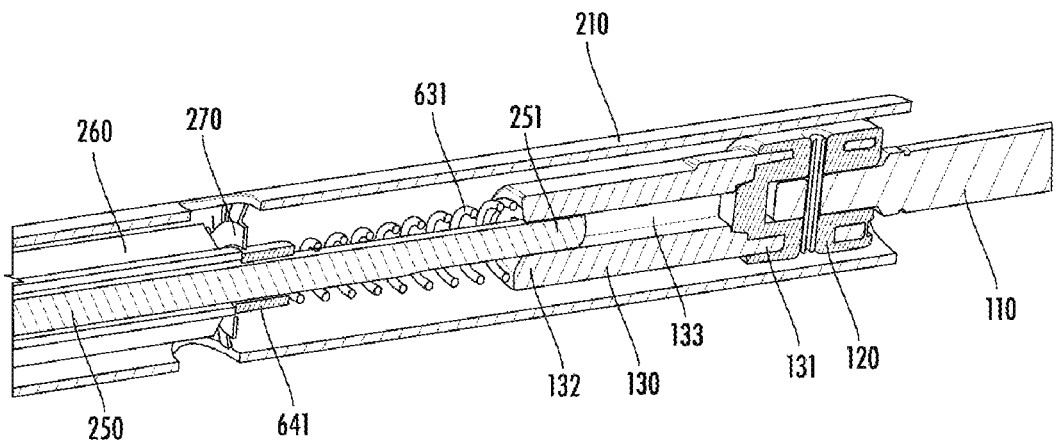
FIG. 13 shows a cross section of the near end of the first tube accommodating the first shaft.

FIG. 13 shows a cross section of a near end 210 of the first tube 200. A near end 251 of the first shaft 250 is transmission-connected to a motive power output end of the motive power head 100. In this embodiment, the motive power output end of the motive power head 100 comprises a motor output shaft 110, a sleeve 130 and a linking member 120 therebetween. The sleeve 130 defines a third shaft hole 133 which is matched in shape to the near end 251 of the first shaft 250. A near end 131 of the sleeve is connected to the linking member 120, and a far end 132 forms an opening of the third shaft hole 133. When the second shaft 350 pushes the shaft coupler 600 and the first shaft 250 to move towards the near side, the near end 251 of the first shaft can move in the third shaft hole 133.

In addition to the first biasing element 630 shown in FIG. 11, the coupling mechanism may further comprise a second biasing element 631, which is arranged at least partially around the near end 251 of the first shaft, to apply a biasing force to the first shaft 250. The second biasing element 631 in FIG. 13 is a spring (called the second spring hereinbelow), e.g. a conical spring, having one end connected to the sleeve 130 and another end connected to a second stop member 641. The second stop member 641 may be fixed to the first shaft 250 so that the second spring 631 is compressed when the first shaft 250 moves towards the near side. In this embodiment, the second stop member 641 is located between a near end of the first bearing unit 260 and the sleeve 130 in the axial direction. When the second shaft hole 621 of the shaft coupler 600 is aligned with the near end 351 of the second shaft 350 in the circumferential direction, the first shaft 250 moves towards the far side under the action of the biasing force applied by the second spring 631, until the second stop member 641 abuts the near end of the first bearing unit 260.

Figure 14:
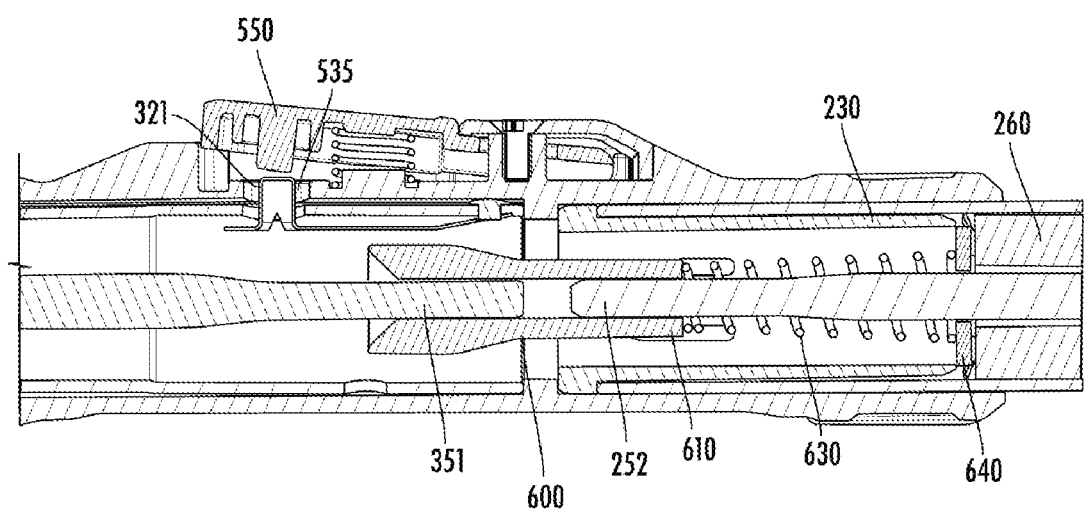
FIG. 14 shows a cross section of the transmission system.

The process of coupling the transmission system according to an embodiment of the present invention is described below with reference to FIG. 14. FIG. 14 shows a cross section of the transmission system, including the tube connector 500 in FIG. 6 and the shaft coupler 600 in FIG. 12C. To perform assembly, the user inserts the second tube 300 into the tube connector 500, until the positioning pin 321 on the second tube 300 passes through the positioning hole 535 of the tube connector 500, thus realizing a locked connection between the second tube 300 and the tube connector 500. If the near end 351 of the second shaft 350 is not aligned with the second shaft hole 621, the shaft coupler 600 moves towards the near side, compressing the first biasing element 630, and at the same time the first shaft 250 moves towards the near side, compressing the second biasing element 631. After confirming that the first pair of clamping arms 528 and the second pair of clamping arms 538 of the tube connector 500 (shown in FIG. 2) have clamped the first tube 200 and the second tube 300 respectively, the user starts up the work tool, and the motor in the working head 100 is activated. The rotation of the motor is transmitted to the shaft coupler 600 via the motor output shaft 110, the linking member 120, the sleeve 130 and the first shaft 250 which are shown in FIG. 13. When the second shaft hole 621 of the shaft coupler 600 rotates to a position in which it is aligned with the near end 351 of the second shaft in the circumferential direction, the first biasing element 630 pushes the shaft coupler 600 to move towards the far side, while the second biasing element 631 pushes the first shaft 250 to move towards the far side, causing the near end 351 of the second shaft to enter the second shaft hole 621. When coupling is complete, the near-side part 610 of the shaft coupler 600 is located in the first connecting channel 521 of the tube connector 500, and the far-side part 620 of the shaft coupler is located in the second connecting channel 531 of the tube connector 500.

The coupling mechanism in the embodiments comprises the first biasing element 630 and the second biasing element 631, wherein the first biasing element 630 applies a coupling force directly to the shaft coupler 600, and the second biasing element 631 applies a coupling force to the first shaft 250 by means of the second stop member 641. It should be understood that each of the first biasing element 630 and the second biasing element 631 can realize a coupling function on its own. The biasing elements may also directly or indirectly apply a coupling force to the shaft coupler 600 and/or the first shaft 250 in another way. In other embodiments, the coupling mechanism may comprise a magnetic element, for example a permanent magnet or an electromagnet. A magnetic element may be arranged to apply a magnetic force to the shaft coupler 600 and/or the second shaft 350; when the second shaft hole 621 of the shaft coupler 600 rotates to a position in which it is aligned with the near end 351 of the second shaft in the circumferential direction, the shaft coupler 600 moves towards the far side under the action of the magnetic force, causing the near end 351 of the second shaft to enter the second shaft hole 621.

The shaft coupler 600 in the embodiments rotates with the first shaft 250. Supposing the rotation speed of the shaft coupler 600 is too fast, the second shaft hole 621 is only briefly in a position in which it is aligned with the near end 351 of the second shaft 350 in the circumferential direction. This might result in a situation in which the shaft coupler 600 has already left the aligned position before beginning to move towards the far side. To solve this problem, the motor may be provided with a coupling mode different from a working mode. The maximum rotation speed of the motor in the coupling mode is less than the minimum rotation speed of the motor in the working mode, less than 50%, 40%, 30%, 20% or 10% of the minimum rotation speed of the motor in the working mode, to ensure that the shaft coupler 600 can move towards the far side after reaching the aligned position. In addition, the work tool may further comprise a sensing unit, for detecting whether the rotation of the first shaft 250 is transmitted to the second shaft 350. If the sensing unit does not detect within a predetermined time that the rotation of the first shaft is transmitted to the second shaft, the control unit can stop the motor, and issue a visually or audibly perceptible prompt to the user. When the sensing unit detects that the rotation of the first shaft being transmitted to the second shaft, the control unit controls the motor to run in the working mode.

Although the present invention has been described in detail in conjunction with limited embodiments, it should be understood that the present invention is not limited to these disclosed embodiments. Those skilled in the art can envisage other embodiments that conform to the spirit and scope of the present invention, including changes in quantities of components, alterations, substitutions or equivalent arrangements, and all such embodiments shall fall within the scope of the present invention.

The invention claimed is:

1. Transmission system for a work tool, comprising:
   a first shaft;
   a second shaft, a near end of the second shaft having a first mating part; and
   a shaft coupler, a far-side part of the shaft coupler having a second mating part matched in shape to the first mating part;
   wherein the transmission system further comprises a coupling mechanism capable of directly or indirectly applying a coupling force to at least one of the first shaft, the second shaft and the shaft coupler; wherein the shaft coupler is configured to transmit rotational movement of the first shaft to the second shaft when the far-side part of the shaft coupler is aligned with the near end of the second shaft in a circumferential direction such that the coupling force forces the first mating part to engage with the second mating part;
   wherein a near-side part of the shaft coupler comprises a first shaft hole for accommodating a far end of the first shaft, the far-side part of the shaft coupler comprises a second shaft hole for accommodating the near end of the second shaft; and
   wherein the far-side part of the shaft coupler further comprises a guide channel defined by an end wall of the shaft coupler extending between a far-end opening of the shaft coupler and the second shaft hole, a cross section of the guide channel gradually decreases in size from the far-end opening towards the second shaft hole; and
   wherein the coupling mechanism comprises a first biasing element arranged at least partially around the far end of the first shaft for applying a first axial biasing force to the shaft coupler and a second biasing element arranged at least partially around a near end of the first shaft for applying a second axial biasing force to the first shaft, and wherein the first shaft and the shaft coupler are configured to rotate until the far side part of the shaft coupler is aligned with the near end of the second shaft in the circumferential direction and one or both of the first axial biasing force and the second axial biasing force pushes the shaft coupler towards the far side such that the second shaft enters the second shaft hole.

2. Transmission system according to claim 1, wherein the first mating part comprises the first shaft and the first shaft hole having a non-circular cross section, the second mating part comprises the second shaft and the second shaft hole having the non-circular cross section, and when the far-side part of the shaft coupler is aligned with the near end of the second shaft in the circumferential direction, the second shaft can enter the second shaft hole.

3. Transmission system according to claim 1, wherein when the far-side part of the shaft coupler and the near end of the second shaft are in contact with each other but not aligned in the circumferential direction, the first axial biasing force of the first biasing element can be overcome by applying a pushing force to the second shaft, causing the shaft coupler to move a certain distance towards the near side.

4. Transmission system according to claim 1, wherein the near-side part of the shaft coupler and the far end of the first shaft are fixedly connected in such a way as to be unable to move relative to each other.

5. Transmission system according to claim 1, wherein the near-side part of the shaft coupler and the far end of the first shaft are connected in such a way as to be movable relative to each other in the axial direction.

6. Transmission system according to claim 1, wherein when the far-side part of the shaft coupler and the near end of the second shaft are in contact with each other but not aligned in the circumferential direction, the second shaft can push the shaft coupler to move towards the near side, while compressing the first biasing element.

7. Transmission system according to claim 1, wherein when the far-side part of the shaft coupler and the near end of the second shaft are in contact with each other but not aligned in the circumferential direction, the second shaft can push the first shaft to move towards the near side, while compressing the second biasing element.

8. Transmission system according to claim 1, wherein the first shaft is transmission-connected to a motive power head of the work tool, the second shaft is transmission-connected to a working head of the work tool, and optionally, at least one of the first shaft and the second shaft comprises multiple shaft segments transmission-connected to each other.

9. Transmission system according to claim 2, wherein the coupling mechanism comprises a magnetic element, the coupling force comprises a magnetic force applied to the shaft coupler and/or the second shaft by the magnetic element, and when the far-side part of the shaft coupler is aligned with the near end of the second shaft in the circumferential direction, the magnetic force forces the shaft coupler to move towards the far side, causing the second shaft to enter the second shaft hole.

10. Transmission system according to claim 1, wherein the transmission system further comprises:
   a first tube, at least part of the first shaft being located in the first tube and rotatable relative to the first tube;

a second tube, at least part of the second shaft being located in the second tube and rotatable relative to the second tube;

a tube connector for connecting the first tube and the second tube, at least part of the shaft coupler being located in the tube connector; and a locking mechanism, comprising a positioning pin and a positioning hole, one of the positioning pin and positioning hole being located on the first tube or second tube, and the other being located on the tube connector; when the positioning pin enters or passes through the positioning hole, relative movement between the first tube or second tube and the tube connector is prevented, and the locking mechanism is in a locked position.

11. Transmission system according to claim 10, wherein the positioning pin is mounted on the second tube by means of a biasing component, and when the locking mechanism is in the locked position, the positioning pin extends through a hole formed in the second tube.

12. Transmission system according to claim 11, wherein the biasing component is pivotably mounted on the second tube by means of a fastener, the fastener comprising a protruding part located outside an outer wall of the second tube.

13. Transmission system according to claim 12, wherein the tube connector comprises a guide groove formed on an inner wall of the tube connector, the dimensions of the guide groove being designed to be suitable for accommodating and guiding the protruding part of the fastener.

14. Transmission system according to claim 10, wherein the locking mechanism further comprises an unlocking element which, when actuated, forces the positioning pin to leave the positioning hole.

15. Transmission system according to claim 10, wherein an inner wall of the tube connector defines a first connecting channel and a second connecting channel, the first connecting channel being used to receive a far end of the first tube, the second connecting channel being used to receive a near end of the second tube, and the first connecting channel and second connecting channel being separated by a flange; when mounting is complete, the near-side part of the shaft coupler is located in the first connecting channel, and the far-side part of the shaft coupler is located in the second connecting channel.

16. Transmission system according to claim 10, wherein the first biasing member comprises a first spring having one end connected to the shaft coupler and another end connected to a first stop member, the first stop member being fixed in the axial direction relative to the first tube; when the far-side part of the shaft coupler and the near end of the second shaft are in contact with each other but not aligned in the circumferential direction, the second shaft can push the shaft coupler to move towards the near side, while compressing the first spring.

17. Transmission system according to claim 10, wherein the near end of the first shaft is transmission-connected to a motive power output end of a motive power head, the motive power output end comprises a sleeve, which defines a third shaft hole matched in shape to the near end of the first shaft, and the near end of the first shaft is able to move in the third shaft hole.

18. Transmission system according to claim 17, wherein second biasing member comprises a second spring having one end connected to the sleeve, and another end fixed to the first shaft or connected to a second stop member fixed to the first shaft; when the far-side part of the shaft coupler and the near end of the second shaft are in contact with each other but not aligned, the second shaft can push the first shaft so that the near end thereof moves in the third shaft hole towards the near side, while compressing the second spring; once the far-side part of the shaft coupler has rotated to a position in which it is aligned with the near end of the second shaft in the circumferential direction, the near end of the first shaft moves in the third shaft hole towards the far side under the action of the second axial biasing force applied by the second spring.

19. Work tool, comprising:
the transmission system according to claim 1;
a motive power head, the first shaft being transmission-connected to the motive power head; and
a working head, the second shaft being transmission-connected to the working head.

20. Work tool according to claim 19, wherein the motive power head comprises a motor, the first shaft being transmission-connected to an output shaft of the motor, and the work tool comprises a control unit which controls the motor to run in a coupling mode or a working mode, a maximum motor rotation speed in the coupling mode being less than 50% of a minimum motor rotation speed in the working mode.

21. Work tool according to claim 20, further comprising a sensing unit; wherein the sensing unit detects that rotation of the first shaft is transmitted to the second shaft, the control unit controls the motor to run in the working mode.

22. Transmission system according to claim 1, wherein the first shaft and the shaft coupler are transmission-connected to a motive power head of the work tool for rotating the first shaft and the shaft coupler until the far side part of the shaft coupler is aligned with the near end of the second shaft in the circumferential direction.

* * * * *